United States Patent
Ho et al.

(10) Patent No.: US 6,678,566 B2
(45) Date of Patent: Jan. 13, 2004

(54) BACKUP CONTROL SYSTEM (BCS) FOR OPTIMIZING UTILIZATION OF MULTIPLE FABRICATION FACILITIES

(75) Inventors: I-Ting Ho, Chung-Ly (TW); I-Chieh Chung, Hsin-Chu (TW); Chuen-He Liou, Taipei (TW)

(73) Assignee: Taiwan Semiconductor Manufacturing Co., Ltd., Hsin Chu (TW)

( * ) Notice: Subject to any disclaimer, the term of this patent is extended or adjusted under 35 U.S.C. 154(b) by 419 days.

(21) Appl. No.: 09/847,463

(22) Filed: May 2, 2001

(65) Prior Publication Data

US 2002/0165629 A1 Nov. 7, 2002

(51) Int. Cl.$^7$ ............................................. G05B 15/00
(52) U.S. Cl. ........................ 700/82; 700/3; 700/21; 700/79; 700/81; 700/49; 700/96; 709/208; 709/209; 709/211; 714/6; 714/7; 714/11
(58) Field of Search ........................... 700/2–5, 49, 46, 700/104, 121, 21, 78, 79, 80, 81, 82; 709/208, 209, 210, 211; 710/110; 711/161, 162; 714/3, 4, 6, 7, 11

(56) References Cited

U.S. PATENT DOCUMENTS

| | | | | |
|---|---|---|---|---|
| 4,890,284 A | * | 12/1989 | Murphy et al. ............... 714/11 |
| 5,544,350 A | * | 8/1996 | Hung et al. ................... 716/19 |
| 5,548,535 A | | 8/1996 | Zvonar |
| 5,586,039 A | * | 12/1996 | Hirsch et al. ................. 700/95 |
| 5,761,064 A | | 6/1998 | La et al. |
| 5,778,386 A | | 7/1998 | Lin et al. |
| 5,844,802 A | * | 12/1998 | Lepper et al. .............. 700/115 |
| 6,052,053 A | * | 4/2000 | Jubin et al. ................. 340/540 |
| 6,061,603 A | * | 5/2000 | Papadopoulos et al. ....... 700/83 |
| 6,148,415 A | * | 11/2000 | Kobayashi et al. ........... 714/15 |
| 6,202,000 B1 | * | 3/2001 | Rheem ....................... 700/121 |
| 6,240,335 B1 | * | 5/2001 | Wehrung et al. ............ 700/230 |

* cited by examiner

Primary Examiner—Ramesh Patel
(74) Attorney, Agent, or Firm—Tung & Associates

(57) ABSTRACT

Within both a method for operating a plurality of fabrication facilities and a system for operating the plurality of fabrication facilities there is providing within each of the plurality of fabrication facilities a corresponding plurality of backup control systems. Within the method and the system, each backup control system is connected with the remaining backup control systems within the remaining fabrication facilities within the plurality of fabrication facilities, and each backup control system is programmed to forward a request for fabrication in a remote fabrication facility within the plurality of fabrication facilities and receive a request for fabrication from a remote fabrication facility within the plurality of fabrication facilities. The method and the system are particularly useful for fabricating semiconductor integrated circuit microelectronic fabrications.

14 Claims, 3 Drawing Sheets

BACKUP CONTROL SYSTEM (BCS) FOR OPTIMIZING UTILIZATION OF MULTIPLE FABRICATION FACILITIES

BACKGROUND OF THE INVENTION

1. Field of the Invention

The present invention relates generally to control systems for controlling fabrication facilities. More particularly, the present invention relates to backup control systems for controlling multiple fabrication facilities.

2. Description of the Related Art

In the art of fabricating modern microelectronic fabrications, and in particular in the art of fabricating modern semiconductor integrated circuit microelectronic fabrications, there is typically employed a computer assisted production control routing system to route a plurality of microelectronic fabrication work in process (WIP) workload lots having a corresponding plurality of microelectronic fabrication routing requirements through a plurality of microelectronic fabrication tools positioned within a microelectronic fabrication facility. Such a computer assisted production control routing system may comprise, in part or in whole, a manufacturing execution system (MES) as employed within the microelectronic fabrication facility.

Similarly, it is also common in the art of microelectronic fabrication for microelectronic fabrication manufacturers to operate a plurality microelectronic fabrication facilities, geographically clustered and/or geographically dispersed, but often with at least partially overlapping microelectronic fabrication product sets fabricated within the plurality of microelectronic fabrication facilities while employing generally similar and/or at least partially overlapping microelectronic fabrication tool sets positioned within the plurality of microelectronic fabrication facilities.

Finally, it is also common in the art of microelectronic fabrication, but clearly not limited to the art of microelectronic fabrication, to experience a continuing need to optimize microelectronic fabrication facilities utilization when fabricating a plurality of microelectronic fabrication part numbers while employing a plurality of microelectronic fabrication routing requirements within a plurality of microelectronic fabrication facilities such as to reduce, in general, microelectronic fabrication production cost.

While such optimized microelectronic fabrication facilities utilization is clearly desirable in the art of microelectronic fabrication, such optimized microelectronic fabrication facilities utilization is nonetheless not routinely readily achievable in the art of microelectronic fabrication insofar as it is often difficult to monitor and control a plurality of microelectronic fabrication facilities, each of which is otherwise generally intended to operate independently.

It is thus desirable in the art of microelectronic fabrication to provide methods, apparatus and systems through which a plurality of microelectronic fabrication facilities may be monitored and controlled to operate with enhanced facilities utilization.

It is towards the foregoing object that the present invention is directed.

Various methods, apparatus and systems have been disclosed in the art of microelectronic fabrication for monitoring and controlling microelectronic fabrication facilities which are employed for fabricating microelectronic fabrications.

Included among the methods, apparatus and systems, but not limited among the methods, apparatus and systems are methods, apparatus and systems disclosed within: (1) Zvonar, in U.S. Pat. No. 5,584,535 (a method and an apparatus for monitoring, tracking and scheduling periodic activities, such as but not limited to periodic preventive maintenance (PM) activities, with respect to a plurality of microelectronic fabrication tools positioned within a microelectronic fabrication facility); (2) La et al., in U.S. Pat. No. 5,761,064 (a method and a system for monitoring and controlling semiconductor substrate defects within a semiconductor integrated circuit microelectronic fabrication facility by collecting semiconductor substrate defect data from semiconductor substrate inspection instruments employed within the semiconductor integrated circuit microelectronic fabrication facility, converting the data into a standard data format and then storing of the data within a central database system within the semiconductor integrated circuit microelectronic fabrication facility where it may be made available for general review, analysis and evaluation within the semiconductor integrated circuit microelectronic fabrication facility); and (3) Lin et al., in U.S. Pat. No. 5,778,386 (a method and a system for monitoring and controlling work in process (WIP) workload stored within a microelectronic fabrication facility by polling all of the work in process (WIP) workload stored within the microelectronic fabrication for identification information which is then stored in a central database within the microelectronic fabrication facility and is accessible to a plurality of programmable workstations within the microelectronic fabrication facility).

Desirable in the art of microelectronic fabrication are additional methods, apparatus and systems through which a plurality of microelectronic fabrication facilities may be monitored and controlled to operate with enhanced facilities utilization.

It is towards the foregoing object that the present invention is directed.

SUMMARY OF THE INVENTION

A first object of the present invention is to provide a method for monitoring and controlling a plurality of microelectronic fabrication facilities and a system for monitoring and controlling the plurality of microelectronic fabrication facilities.

A second object of the present invention is to provide a method and a system in accord with the first object of the present invention, wherein the plurality of microelectronic fabrication facilities is monitored and controlled to operate with enhanced facilities utilization.

A third object of the present invention is to provide a method and a system in accord with the first object of the present invention and the second object of the present invention, wherein the method and the system are readily commercially implemented.

In accord with the objects of the present invention, there is provided by the present invention a method for operating a plurality of fabrication facilities and a system for operating the plurality of fabrication facilities.

To practice the method of the present invention, there is first provided a plurality of fabrication facilities, where each fabrication facility is controlled by a separate corresponding manufacturing execution system. There is also provided within each of the plurality of fabrication facilities, and connected with each of the separate corresponding manufacturing execution systems, a corresponding plurality of backup control systems, where each backup control system is connected with the remaining backup control systems within the remaining fabrication facilities within the plurality of fabrication facilities. Within the present invention, each backup control system is programmed to forward a request for fabrication in a remote fabrication facility within the plurality of fabrication facilities and receive a request for fabrication from a remote fabrication facility within the plurality of fabrication facilities. Similarly, within the method of the present invention, each of the backup control systems may also be programmed to monitor fabrication progress of a fabrication request with a remote fabrication facility within the plurality of fabrication facilities. Finally, within the method of the present invention there is then initiated through a backup control system within a fabrication facility within the plurality of fabrication facilities a request for fabrication within a remote fabrication facility within the plurality of fabrication facilities.

The method for monitoring and controlling the plurality of fabrication facilities in accord with the present invention contemplates the system for monitoring and controlling the plurality of fabrication facilities in accord with the present invention.

The present invention provides a method for monitoring and controlling a plurality of fabrication facilities and a system for monitoring and controlling the plurality of fabrication facilities, wherein the plurality of fabrication facilities is monitored and controlled to provide enhanced facilities utilization.

The present invention realizes the foregoing object by employing within the method of the present invention and the system of the present invention, and incorporated within each fabrication facility within a plurality of fabrication facilities, each fabrication facility otherwise having its own manufacturing execution system, a backup control system connected with each remaining backup control system within the plurality of fabrication facilities. Similarly, within the present invention, each backup control system within the plurality of backup control systems is programmed to forward a request for fabrication in a remote fabrication facility within the plurality of fabrication facilities, receive a request for fabrication from a remote fabrication facility within the plurality of fabrication facilities and preferably also monitor fabrication progress of a fabrication request within a remote fabrication facility within the plurality of fabrication facilities.

The method of the present invention and the system of the present invention are readily commercially implemented.

As will be illustrated in greater detail within the context of the Description of the Preferred Embodiment, as set forth below, the method of the present invention and the system of the present invention may be implemented employing components as are otherwise generally conventional in the art of microelectronic fabrication facility operation, but assembled and programmed in accord with the method and the present invention and the system of the present invention.

Since it is thus at least in part an assembly and programming of components which provides at least in part the present invention, rather than the existence of components which provides the present invention, the method of the present invention and the system of the present invention are readily commercially implemented.

BRIEF DESCRIPTION OF THE DRAWINGS

The objects, features and advantages of the present invention are understood within the context of the Description of the Preferred Embodiment, as set forth below. The Description of the Preferred Embodiment is understood within the context of the accompanying drawings, which form a material part of this disclosure wherein.

DESCRIPTION OF THE PREFERRED EMBODIMENT

The present invention provides a method for monitoring and controlling a plurality of microelectronic fabrication facilities and a system for monitoring and controlling the plurality of microelectronic fabrication facilities, wherein the plurality of microelectronic fabrication facilities is monitored and controlled to provide enhanced facilities utilization.

The present invention realizes the foregoing object by employing within the method of the present invention and the system of the present invention, and incorporated within each fabrication facility within a plurality of fabrication facilities each otherwise having its own manufacturing execution system, a backup control system connected with each remaining backup control system within the plurality of fabrication facilities. Similarly, within the present invention, each backup control system is programmed to forward a request for fabrication in a remote fabrication facility within the plurality of fabrication facilities, receive a request for fabrication from a remote fabrication facility within the plurality of fabrication facilities and preferably monitor fabrication progress of a fabrication request with a remote fabrication facility within the plurality of fabrication facilities.

Although the present invention and the preferred embodiment of the present invention provide particular value within the context of monitoring and controlling a plurality of semiconductor integrated circuit microelectronic fabrication facilities within which is fabricated a plurality of semiconductor integrated circuit microelectronic fabrications, the present invention may in general be employed for monitoring and controlling pluralities of fabrication facilities within which are fabricated fabrications including but not limited to chemical fabrications, electrical fabrications and mechanical fabrications. More particularly, but still generally, the present invention provides value within the context of monitoring and controlling a plurality of fabrication facilities wherein there is fabricated, at least in part while employing an overlapping set of fabrication part numbers or fabrication tool sets, fabrications which are fabricated employing generally complex multi-step (i.e., greater than about 200 process steps) fabrication processes.

When employed for monitoring and controlling a plurality of fabrication facilities within which is fabricated a plurality of microelectronic fabrications, the method of the present invention and the system of the present invention may be employed for fabricating microelectronic fabrications selected from the group including but not limited to integrated circuit microelectronic fabrications, ceramic substrate microelectronic fabrications, solar cell optoelectronic microelectronic fabrications, sensor image array optoelectronic microelectronic fabrications and display image array optoelectronic microelectronic fabrications.

Figure 1:
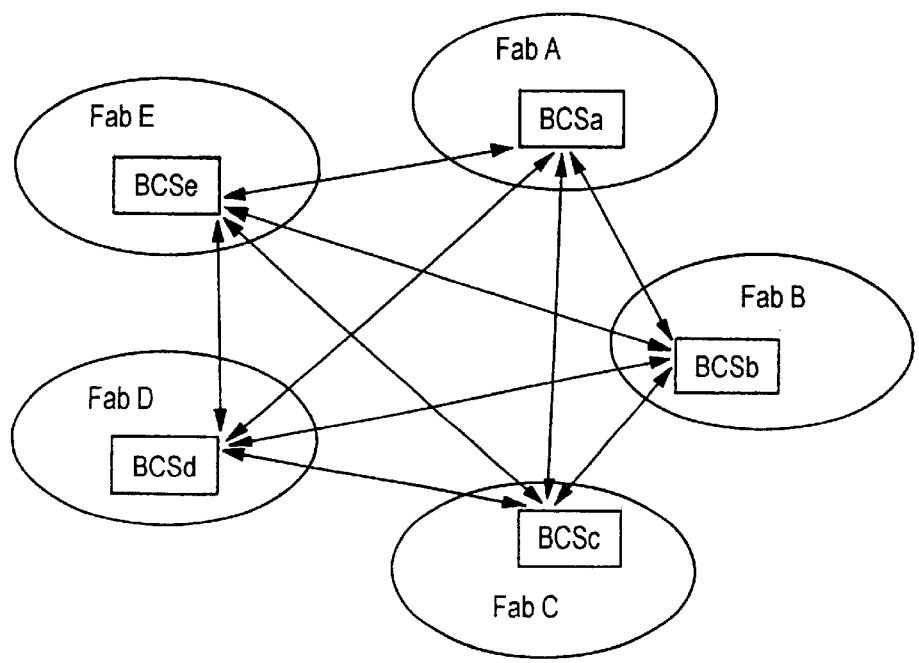
FIG. 1 shows a schematic diagram illustrating a plurality of fabrication facilities whose production may be monitored and controlled in accord with the method of the present invention and the system of the present invention.

Referring now to FIG. 1, there is shown a schematic diagram illustrating a plurality of fabrication facilities whose production may be monitored and controlled in accord with the method of the present invention and the system of the present invention.

Shown in FIG. 1 is a series of fabrication facilities, Fab A, Fab B, Fab C, Fab D and Fab E, each of which has incorporated and installed therein a corresponding backup control system BSCa, BCSb, BCSc, BCSd or BCSe.

As is understood by a person skilled in the art, and within the context of the present invention and the preferred embodiment of the present invention, each of the fabrication facilities Fab A, Fab B, Fab C, Fab D and Fab E is typically and preferably a semiconductor integrated circuit microelectronic fabrication facility, although, as noted above, the present invention also has applicability for monitoring and controlling a plurality of fabrication facilities within which may be fabricated fabrications selected from the group including but not limited to chemical fabrications, mechanical fabrications and electrical fabrications.

While the preferred embodiment of the present invention as illustrated within the schematic diagram of FIG. 1 illustrates the present invention within the context of monitoring and controlling five fabrication facilities, the present invention may nonetheless be employed for monitoring and controlling production within a minimum of two fabrication facilities and is otherwise open ended with respect to a number of fabrication facilities whose production may be monitored and controlled, but will typically and preferably be from about 2 to about 10 fabrication facilities.

As is understood by a person skilled in the art, and as an implicit requirement with respect to the present invention, each of the series of fabrication facilities Fab A, Fab B, Fab C, Fab D and Fab E employs a fabrication tool set which at least in part overlaps in process capabilities with a fabrication tool set which is employed within at least one other of the series of fabrication facilities Fab A, Fab B, Fab C, Fab D and Fab E. More typically and preferably each of the fabrication facilities Fab A, Fab B, Fab C, Fab D and Fab E will employ a tool set which overlaps at least in part, and more typically and preferably overlaps in considerable part, with each of the other fabrication facilities within the series of fabrication facilities Fab A, Fab B, Fab C, Fab D and Fab E.

Within the present invention and the preferred embodiment of the present invention with respect to the series of backup control systems BCSa, BCSb, BCSc, BCSd and BCSe, it is at least in part the architecture, the construction and the use of each of the backup control systems BCSa, BCSb, BCSc, BCSd and BCSe which provides at least in part the present invention. In that regard, and in accord with the schematic diagram of FIG. 1, it is noted that each of the backup control systems BCSa, BCSb, BCSc, BCSd and BCSe within the corresponding series of fabrication facilities Fab A, Fab B, Fab C, Fab D and Fab E is connected to the remaining four of the backup control systems BCSa, BCSb, BCSc, BCSd and BCSe within the remaining four of the fabrication facilities Fab A, Fab B, Fab C, Fab D and Fab E. Similarly, and as is also illustrated within the schematic diagram of FIG. 1, each of the backup control systems BCSa, BCSb, BCSc, BCSd and BCSe within the series of backup control systems BCSa, BCSb, BCSc, BCSd and BCSe is directly connected to the remaining four of the backup control systems BCSa, BCSb, BCSc, BCSd and BCSe within the series of backup control systems BCSa, BCSb, BCSc, BCSd and BCSe absent a higher level backup control system, database or other centralized component (in particular a centralized communications component) to which is connected in a hub and spoke fashion each of the backup control systems BCSa, BCSb, BCSc, BCSd and BCSe. While the preferred embodiment of the present invention preferably does not employ such a centralized component, such is nonetheless not precluded within the context of the present invention, and may be desirable within the present invention under circumstances where an increased number of backup control systems within an increased number of fabrication facilities provides in general for inefficient interconnections within the context of the plurality of fabrication facilities as illustrated within the schematic diagram of FIG. 1.

Figure 2:
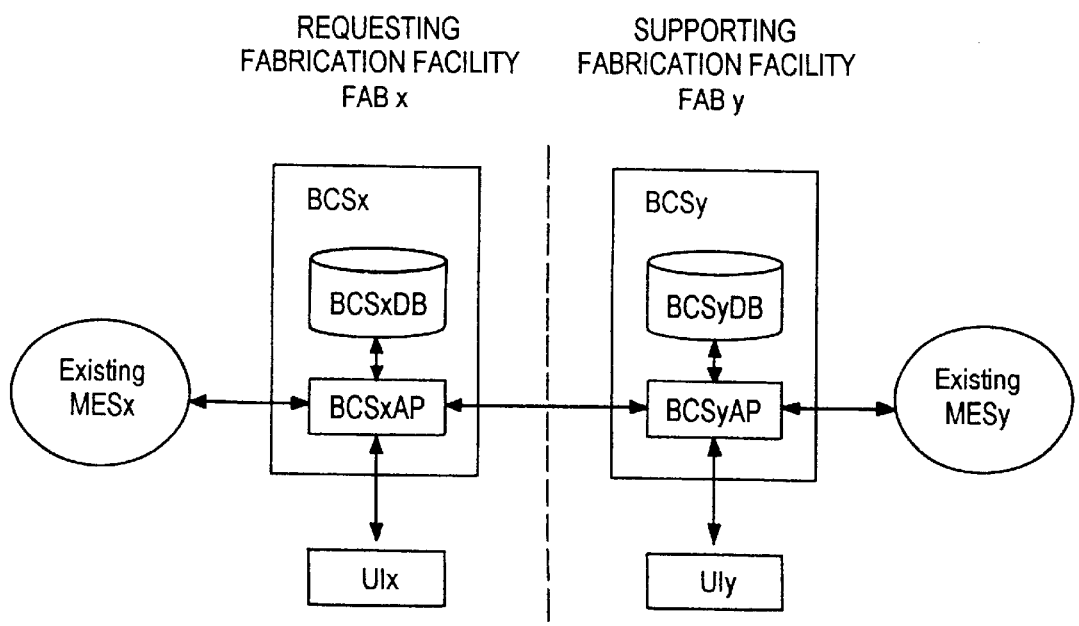
FIG. 2 shows a schematic diagram illustrating in greater detail a pair of interconnected backup control systems within a pair of fabrication facilities in accord with a preferred embodiment of the method of the present invention and the system of the present invention.

Referring now to FIG. 2, there is shown a schematic diagram illustrating in greater detail a pair of interconnected backup control systems within a pair of fabrication facilities in accord with a preferred embodiment of the present invention.

Shown in FIG. 2, in a first instance, is a backup control systems BCSx which is contained within a requesting fabrication facility Fab X and a backup control system BCSy which is contained within a supporting fabrication facility Fab Y. As is illustrated within the schematic diagram of FIG. 2, each of the backup control systems BCSx and BCSy comprises a corresponding backup control system database BCSxDB or BCSyDB whose contents may be locally accessed and updated by means of a corresponding appropriate backup control system application software program BCSxAP or BCSyAP. Similarly, and as is also illustrated within the schematic diagram of FIG. 2, the backup control system BCSx within the requesting fabrication facility Fab X is accessed within the requesting fabrication facility Fab X by means of a user interface UIx and the backup control system BCSy within the supporting fabrication facility Fab Y is accessed within the supporting fabrication facility Fab Y by a user interface UIy. As is understood by a person skilled in the art, each of the user interface UIx and the user interface UIy typically and preferably comprises a computer keyboard interface and a computer video interface as are otherwise generally conventional in the art of distributed communications networks, although other user interface components may also be employed within the context of the present invention and the preferred embodiment of the present invention. Similarly, each of the backup control system databases BCSxDB and BCSyDB is typically and preferably housed within a computer hard drive data storage and retrieval device, although other backup control system database storage and retrieval devices may similarly also be employed within the present invention and the preferred embodiment of the present invention.

Finally, as is illustrated within the schematic diagram of FIG. 2, each of the requesting fabrication facility Fab X and the supporting fabrication facility Fab Y is at least in part controlled by a corresponding existing manufacturing execution system MESx or a corresponding existing manufacturing execution system MESy.

As is understood by a person skilled in the art, the existing manufacturing execution system MESx need not be identical to or equivalent with the existing manufacturing execution system MESy. Similarly, within the context of semiconductor integrated circuit microelectronic fabrication facilities, manufacturing execution system MES products, such as but not limited to PROMIS(™) and POSIEDON(™) are common in the art and are described at least in part in somewhat greater detail within the references cited within the Description of the Related Art, the teachings of all of which related art references are incorporated herein fully by reference.

As is further understood by a person skilled in the art, the linking software between the backup control system BCSx within the requesting fabrication facility Fab X and the backup control system BCSy within the supporting fabrication facility Y, which comprises the requesting fabrication facility Fab X backup control system application software program BCSxAP and the supporting fabrication facility Fab Y backup control system application software program BCSyAP, may be commercially available networking software, such as may be obtained for example and without limitation from TIBCO Software Inc., 3165 Porter Drive, Palo Alto, Calif. 94304 USA, but may also be obtained from other sources.

Figure 3:
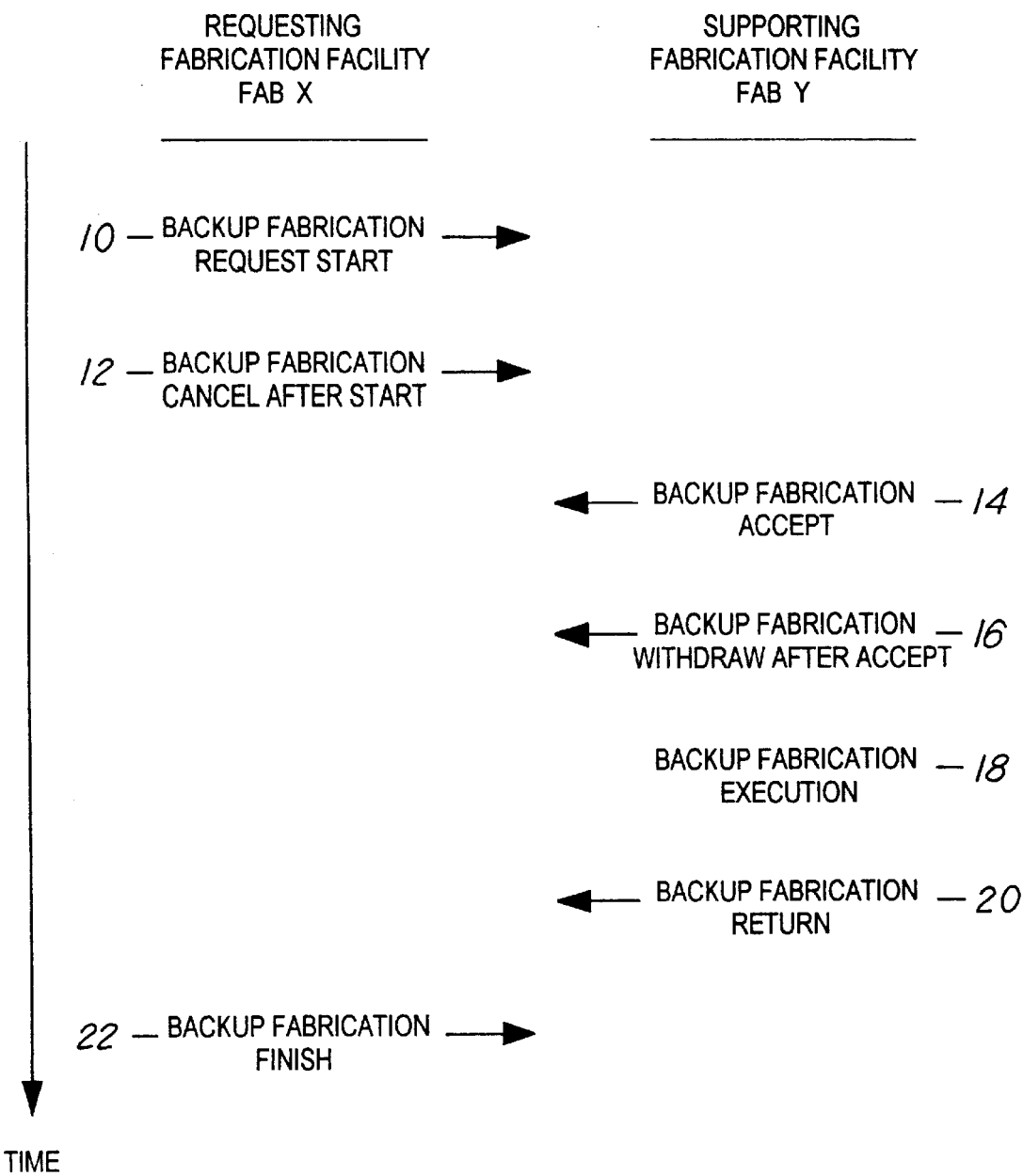
FIG. 3 shows a schematic process flow diagram illustrating operation of the method of the present invention.

Referring now to FIG. 3, there is shown a schematic process flow diagram illustrating operation of the method of the present invention.

As is illustrated within the schematic process flow diagram of FIG. 3, fabrication process actions which are initiated by the requesting fabrication facility Fab X are listed, in accord with an arbitrary progressing time line, within the left column under the Requesting Fabrication Facility Fab X heading, while fabrication process actions which are initiated by the supporting fabrication facility Fab Y are listed, in accord with the arbitrary progressing time line, within the right column under the Supporting Fabrication facility Fab Y heading. The series of arrows from left to right or right to left indicate a direction of communication between backup control systems within the requesting fabrication facility Fab X and the supporting fabrication facility Fab Y.

In accord with the fabrication process action which corresponds with reference numeral 10, the requesting fabrication facility Fab X first issues a backup fabrication request start to the supporting fabrication facility Fab Y. Further in accord with the fabrication process action which corresponds with reference numeral 12, the backup fabrication request start issued in accord with reference numeral 10 may be canceled by the requesting fabrication facility Fab X after the backup fabrication request start in accord with reference numeral 10 has been issued to the supporting fabrication facility Fab Y. This feature is particularly desirable within the context of the present invention and the preferred embodiment of the present invention under circumstances where a plurality of potential supporting fabrication facilities is polled for an ability to undertake and complete a particular backup fabrication request, and at least one potential supporting fabrication facility within the plurality of potential supporting fabrication facilities has responded affirmatively and has been chosen prior to a response from other of the potential supporting fabrication facilities. Thus within the present invention and the preferred embodiment of the present invention, fabrication requests from a requesting fabrication facility may be issued to single supporting fabrication facility or multiple supporting fabrication facilities.

Referring again to the schematic process flow diagram of FIG. 3, and in accord with the fabrication process actions which correspond with reference numeral 14 and reference numeral 16, the supporting fabrication facility Fab Y can then accept a backup fabrication request from the requesting fabrication facility Fab X, and also within a time period thereafter the supporting fabrication facility Fab Y can cancel the accepted backup fabrication request. This latter feature is similarly also desirable within the context of the present invention and the preferred embodiment of the present invention under circumstance where the supporting fabrication facility Fab Y is be subject to multiple simultaneous backup fabrication requests, some but not all of which can be completed within the context of available supporting fabrication facility Fab Y capacity and backup fabrication request constraints.

Referring again to the schematic process flow diagram of FIG. 3, and in accord with the block which corresponds with reference numeral 18, a backup fabrication request work in process (WIP) workload is then fabricated within the supporting fabrication facility Fab Y.

Referring again to the schematic process flow diagram of FIG. 3, and in accord with the block which corresponds with reference numeral 20, the backup fabrication request work in process (WIP) workload which has been fabricated within the supporting fabrication facility Fab Y is returned to the requesting fabrication facility Fab X.

Finally, and referring again to the schematic process flow diagram of FIG. 3, the requesting fabrication facility X finishes the backup fabrication request, in general by confirming that the backup fabrication work in process (WIP) workload which has been fabricated within the supporting fabrication facility Fab Y has been returned, as expected, to the requesting fabrication facility Fab X.

Figure 4:
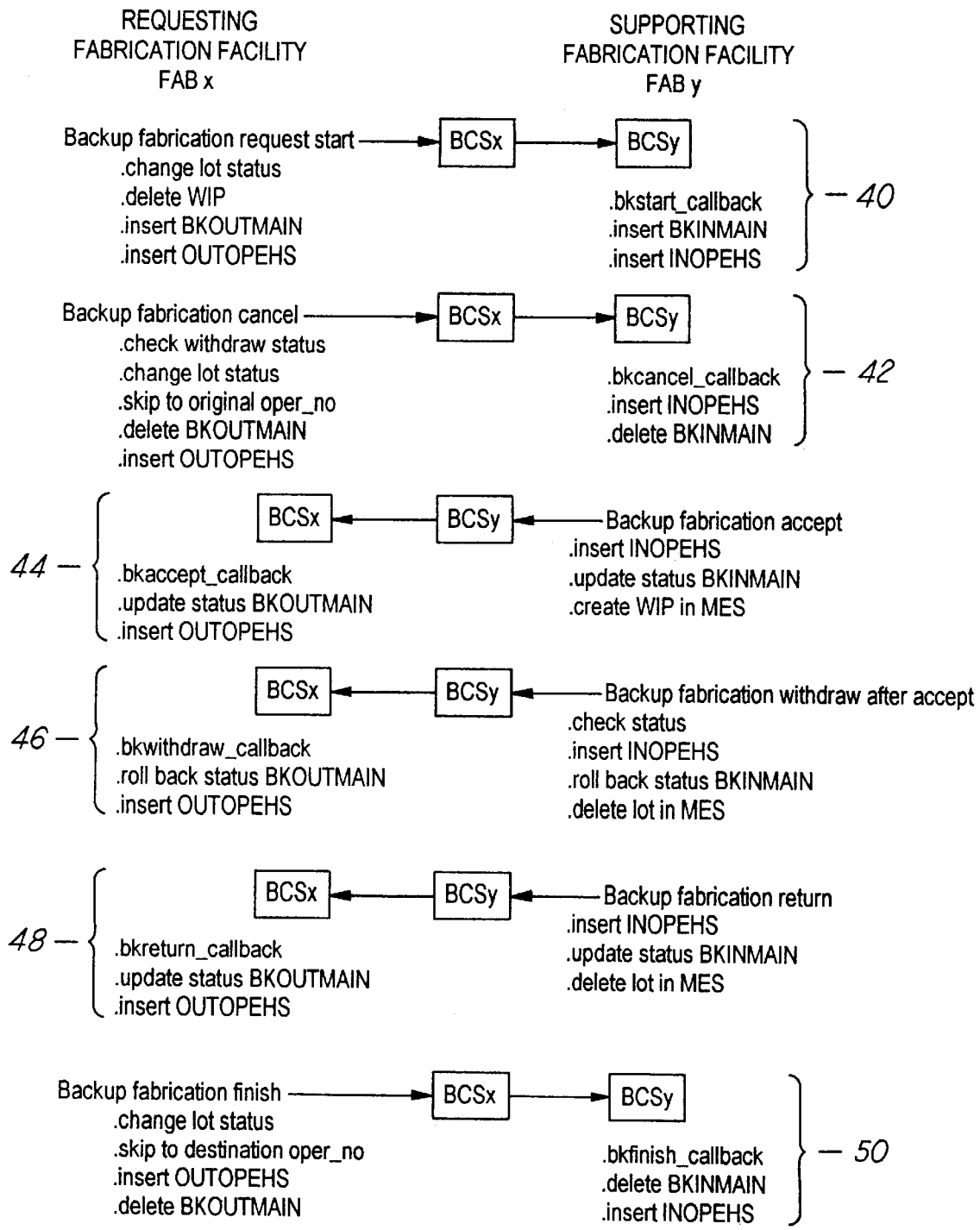
FIG. 4 shows a software flow diagram illustrating in greater detail a series of programming instructions which may be employed within the method of the present invention as illustrated within the schematic process flow diagram of FIG. 3.

Referring now to FIG. 4, there is shown a software flow diagram illustrating in greater detail a series of programming instructions which may be employed within the method of the present invention as illustrated within the schematic process flow diagram of FIG. 3.

Shown in FIG. 4, and in accord with programming instructions which correspond with reference numeral 40, and with respect to the backup control system BCSx within the requesting fabrication facility Fab X, there is first entered a series of instructions which: (1) change the lot status of a work in process (WIP) workload lot while deleting the work in process (WIP) workload lot from a manufacturing execution system (MES) within the requesting fabrication facility Fab X; and (2) generate a backup out of facility lot status file (BKOUTMAIN) and an out of facility operations history file (OUTOPEHS) for the work in process (WIP) workload lot. Similarly, and incident to communication from the backup control system BCSx within the requesting fabrication facility Fab X to the backup control system BCSy within the supporting fabrication facility Fab Y, there is entered: (1) a backup start callback confirmation; (2) a backup in facility lot status file (BKINMAIN) corresponding with the backup out of facility lot status file; and (3) an in facility operations history file (INOPEHS) corresponding with the out of facility operations history file, for the work in process (WIP) workload lot for which there is desired backup fabrication within the supporting fabrication facility Fab Y.

Referring again to the software flow diagram of FIG. 4, and in accord with the series of programming instructions which corresponds with reference numeral 42, and further in order to cancel a backup fabrication request from the requesting fabrication facility Fab X, a countermanding series of instructions is entered within the backup control system BCSx within the requesting fabrication facility Fab X which: (1) check a withdrawal status, change a lot status and skip to an original operation number for the work in process (WIP) workload lot for which backup fabrication was previously sought in the supporting fabrication facility Fab Y; while (2) deleting the backup out of main file and updating the out of facility operations history file accordingly. Incident to communication from the backup control system BCSx within the requesting fabrication facility Fab X to the backup control system BCSy within the supporting fabrication facility Fab Y, there is issued: (1) a backup cancel callback confirmation; as well as (2) an instruction to delete the backup in facility routing file within the supporting fabrication facility Fab Y and update the in facility operations history file within the supporting fabrication facility Fab Y.

Referring again to the schematic software flow diagram of FIG. 4, and in accord with the series of programming instructions which corresponds with reference numeral 44, and further to accept a backup fabrication request, the backup control system BCSy within the supporting fabrication facility Fab Y provides for creation of a work in process (WIP) workload routing within the manufacturing execution system (MES) within the supporting fabrication facility Fab Y; while (2) updating the status of the backup in facility lot status file for the requested backup fabrication request and updating the in facility operations history file for the requested backup fabrication request within the supporting fabrication facility Fab Y. Incident to communication from the backup control system BCSy within the supporting fabrication facility Fab Y to the backup control system BCSx within the requesting fabrication facility Fab X, the requesting fabrication facility: (1) enters a callback confirmation of the backup acceptance within the supporting fabrication facility Fab Y; and (2) appropriately updates and the backup out of facility routing file and the out of facility operations history file, for the requested backup work in process (WIP) workload lot.

Referring again to the software flow diagram of FIG. 4, and in accord with the series of programming instructions which corresponds with reference numeral 46, and further in order to cancel a backup fabrication request after having accepted the backup fabrication request, within the backup control system BCSy within the supporting fabrication facility Fab Y, there is: (1) rolled back the status of the requested backup fabrication work in process (WIP) workload lot and deleted the backup fabrication work in process (WIP) workload lot from within the manufacturing execution system (MES) within the supporting fabrication facility Fab Y; while (2) updating the in facility operations history of the requested backup work in process (WIP) workload lot within the supporting fabrication facility Fab Y. Incident to communication from the backup control system BCSy within the supporting fabrication facility Fab Y to the backup control system BCSx within the requesting fabrication facility Fab X, there is: (1) issued a backup cancel confirmation to the requesting fabrication facility Fab X; and (2) rolled back the status of the requested backup work in process (WIP) workload within the requesting fabrication facility Fab X, while similarly again updating the out of facility operations history for the requested backup work in process (WIP) workload lot.

Referring again to the software flow diagram of FIG. 4 and in accord with the set of programming instructions which corresponds with reference numeral 48, and further in order to return a requested backup fabrication work in process (WIP) workload lot once having been fabricated within the supporting fabrication facility Fab Y, within the backup control system BCSy within the supporting fabrication facility Fab Y there is: (1) deleted the requested backup fabrication work in process workload lot within the manufacturing execution system (MES) within the supporting fabrication facility Fab Y; and (2) updated the status of the backup in lot status file and the in facility operations history file for the requested backup work in process (WIP) workload lot within the supporting fabrication facility Fab Y. Incident to communication from the backup control system BCSy within the supporting fabrication facility Y to the backup control system BCSx within the requesting fabrication facility Fab Y, there is forwarded: (1) a backup return confirmation, as well as (2) an update of the backup out of lot status file and the backup out of facility operations history file.

Referring finally again to the schematic software flow diagram of FIG. 4, and in accord with the series of programming instructions which corresponds with reference numeral 50, and further in order to complete a backup fabrication sequence, within the backup control system BCSx within the requesting fabrication facility X: (1) the backup work in process (WIP) workload lot status is changed and advanced to its destination operation with the requesting fabrication facility Fab X; while (2) updating the out of facility operation history file and deleting the out of facility routing file. Incident to communication from the backup control system BCSx within the requesting fabrication facility Fab X to the backup control system BCSy within the supporting fabrication facility Fab Y, there is: (1) forwarded a backup finish confirmation; and (2) deleted the in lot status file and updated the in facility operations history file, for the requested and completed work in process (WIP) workload lot within the supporting fabrication facility Fab Y.

Although not specifically illustrated within the schematic software flow diagram of FIG. 4, within the present invention and the preferred embodiment of the present invention, the pair of backup control systems BCSx and BCSy (as well as any additional interconnected backup control systems) are preferably programmed such that a requesting fabrication facility, such as the requesting fabrication facility Fab X, has a continuous and updated view of progress of a an accepted backup fabrication request within a supporting fabrication facility, such as the supporting fabrication facility Fab Y.

Subsequent to execution of the programming instructions as illustrated within the software flow diagram of FIG. 4, additional processing of the work in process (WIP) workload for which back up processing within the supporting fabrication facility Fab Y was requested and completed may resume within the requesting fabrication facility Fab X.

Upon executing the preferred embodiment of the method of the present invention in accord with the preferred embodiment of the system of the present invention in accord with the foregoing Description of the Preferred Embodiment, there is provided in accord with the present invention and the preferred embodiment of the present invention provides a method for monitoring and controlling a plurality of microelectronic fabrication facilities and a system for monitoring and controlling the plurality of microelectronic fabrication facilities, wherein the plurality of microelectronic fabrication facilities is monitored and controlled to provide enhanced facilities utilization.

The present invention realizes the foregoing object by employing within the method of the present invention and the system of the present invention, and incorporated within each fabrication facility within a plurality of fabrication facilities each otherwise having its own manufacturing execution system, a backup control system connected with each remaining backup control system within the plurality of fabrication facilities. Similarly, within the present invention, each backup control system is programmed to forward a request for fabrication in a remote fabrication facility within the plurality of fabrication facilities, receive a request for fabrication from a remote fabrication facility within the plurality of fabrication facilities and preferably monitor fabrication progress of a fabrication request with a remote fabrication facility within the plurality of fabrication facilities.

As is understood by a person skilled in the art, the preferred embodiment of the present invention is illustrative of the present invention rather than limiting of the present invention. Revisions and modifications may be made to methods and systems through which is fabricated a fabrication in accord with the preferred embodiment of the present invention while still providing a method for operating a series of fabrication facilities and a system for operating the series of fabrication facilities, further in accord with the appended claims.

What is claimed is:

1. A method for operating a plurality of fabrication facilities comprising:

providing a plurality of fabrication facilities, each fabrication facility being controlled by a separate corresponding manufacturing execution system;

providing within each of the plurality of fabrication facilities, and connected with each of the separate corresponding manufacturing execution systems, a corresponding plurality of backup control systems, each backup control system being connected with the remaining backup control systems within the remaining fabrication facilities within the plurality of fabrication facilities, each backup control system being programmed to forward a request for fabrication in a remote fabrication facility within the plurality of fabrication facilities and receive a request for fabrication from a remote fabrication facility within the plurality of fabrication facilities; and initiating through a backup control system within a fabrication facility within the plurality of fabrication facilities a request for fabrication within a remote fabrication facility within the plurality of fabrication facilities.

2. The method of claim 1 wherein each backup control system is also programmed to monitor fabrication progress of a fabrication request with a remote fabrication facility within the plurality of fabrication facilities.

3. The method of claim 1 wherein the plurality of fabrication facilities is selected from the group consisting of chemical fabrication facilities, mechanical fabrication facilities and electrical fabrication facilities.

4. The method of claim 1 wherein the plurality of fabrication facilities are microelectronic fabrication facilities selected from the group consisting of integrated circuit microelectronic fabrication facilities, ceramic substrate microelectronic fabrication facilities, solar cell optoelectronic microelectronic fabrication facilities, sensor image array optoelectronic microelectronic fabrication facilities and display image array optoelectronic microelectronic fabrication facilities.

5. The method of claim 1 wherein there is not employed a centralized communications component interposed between the plurality of backup control systems.

6. The method of claim 1 wherein there is employed a centralized communications component interposed between the plurality of backup control systems.

7. The method of claim 1 wherein the request for fabrication within the remote fabrication facility is polled to all remaining fabrication facilities within the plurality of fabrication facilities.

8. The method of claim 1 wherein the request for fabrication within the remote fabrication facility is forwarded to a single remaining fabrication facility within the plurality of fabrication facilities.

9. A system for operating a plurality of fabrication facilities comprising:

a plurality of fabrication facilities, each fabrication facility being controlled by a separate corresponding manufacturing execution system;

a corresponding plurality of backup control systems provided within each of the plurality of fabrication facilities and connected with each of the separate corresponding manufacturing execution systems, each backup control system being connected with the remaining backup control systems within the remaining fabrication facilities within the plurality of fabrication facilities, each backup control system being programmed to forward a request for fabrication in a remote fabrication facility within the plurality of fabrication facilities and receive a request for fabrication from a remote fabrication facility within the plurality of fabrication facilities.

10. The system of claim 9 wherein each backup control system is also programmed to monitor fabrication progress of a fabrication request with a remote fabrication facility within the plurality of fabrication facilities.

11. The system of claim 9 wherein the plurality of fabrication facilities is selected from the group consisting of chemical fabrication facilities, mechanical fabrication facilities and electrical fabrication facilities.

12. The system of claim 9 wherein the plurality of fabrication facilities is a plurality of microelectronic fabrication facilities selected from the group consisting of integrated circuit microelectronic fabrication facilities, ceramic substrate microelectronic fabrication facilities, solar cell optoelectronic microelectronic fabrication facilities, sensor image array optoelectronic microelectronic fabrication facilities and display image array optoelectronic microelectronic fabrication facilities.

13. The system of claim 9 wherein there is not employed a centralized communications component interposed between the plurality of backup control systems.

14. The system of claim 9 wherein there is employed a centralized communications component interposed between the plurality of backup control systems.

* * * * *